Sept. 18, 1956     H. H. HOLLY     2,763,026
MATERIAL REMOVING DEVICE FOR MOLDING APPARATUS
Filed Nov. 19, 1953     3 Sheets-Sheet 1

Inventor
Harry H. Holly
By Schroeder, Merriam, Hofgren & Brady
Attorneys

Sept. 18, 1956        H. H. HOLLY        2,763,026
MATERIAL REMOVING DEVICE FOR MOLDING APPARATUS
Filed Nov. 19, 1953        3 Sheets-Sheet 2
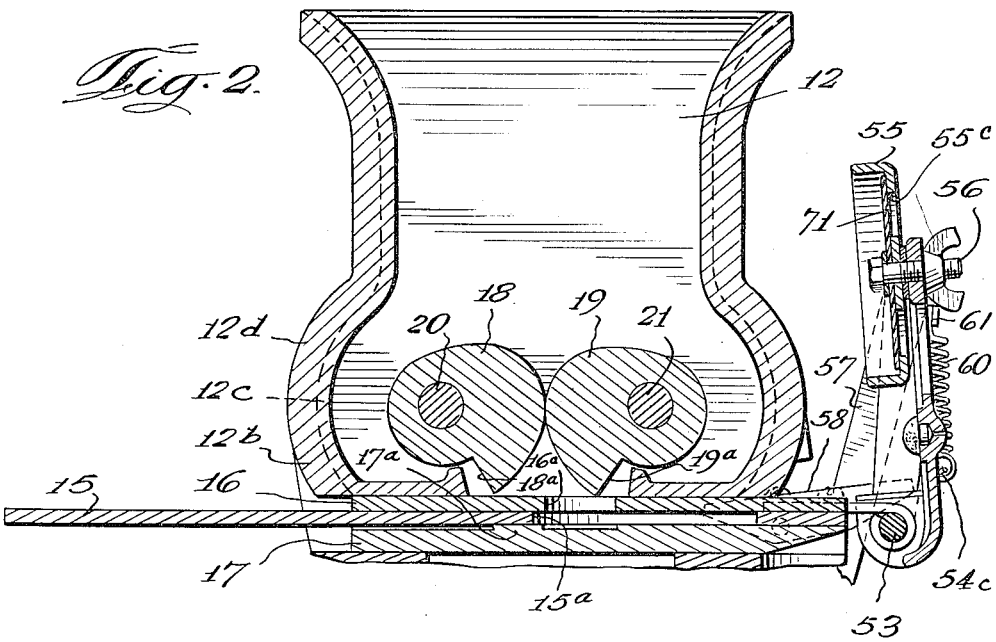
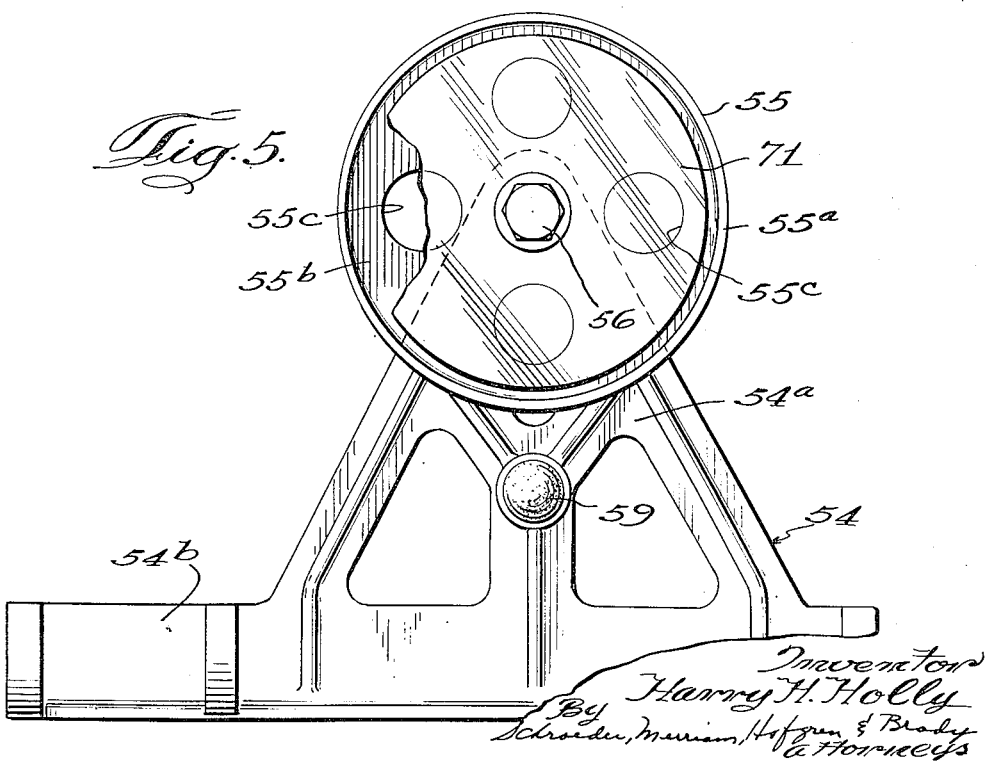

Sept. 18, 1956 H. H. HOLLY 2,763,026
MATERIAL REMOVING DEVICE FOR MOLDING APPARATUS
Filed Nov. 19, 1953 3 Sheets-Sheet 3
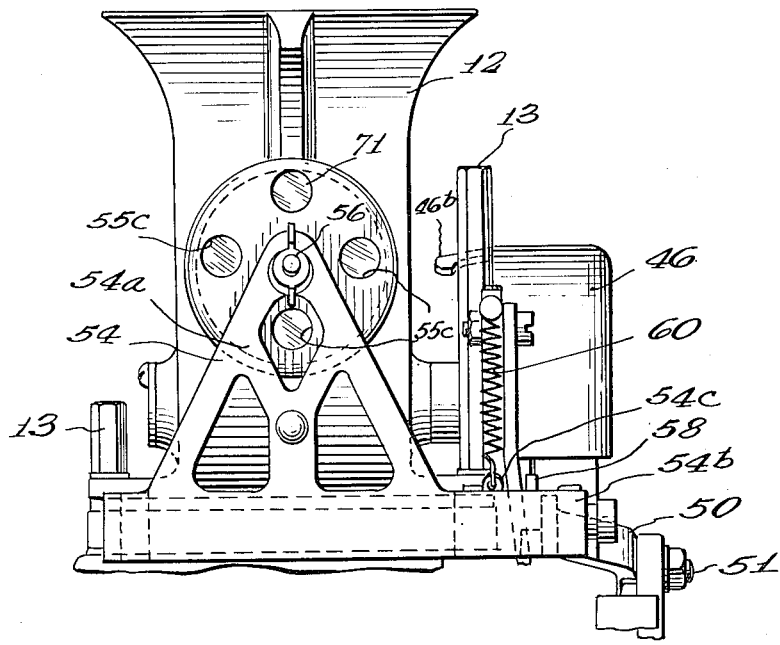
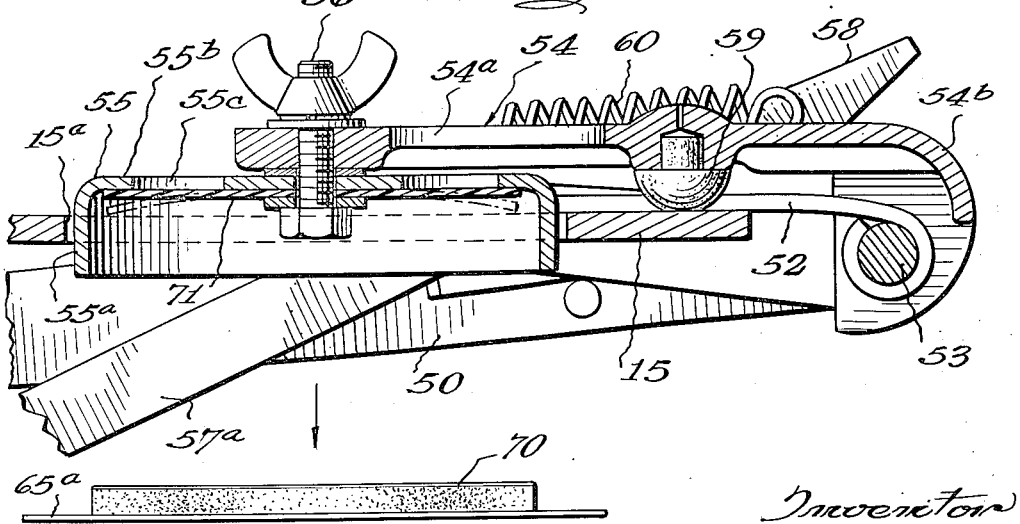
Inventor
Harry H. Holly
By Schroeder, Merriam, Hofgren & Brady
Attorneys ited States Patent Office 2,763,026
Patented Sept. 18, 1956

2,763,026

MATERIAL REMOVING DEVICE FOR MOLDING APPARATUS

Harry H. Holly, Chicago, Ill., assignor to Hollymatic Corporation, a corporation of Illinois Application November 19, 1953, Serial No. 393,175

6 Claims. (Cl. 17—32)

This invention relates to an apparatus for molding a plastic material such as ground meat to form articles such as meat patties. This application is a continuation-in-part of my copending application Serial No. 360,866, filed June 11, 1953.

One of the features of this invention is to provide such an apparatus including a mold having a mold opening into which the material is received to form the molded portion and from which this portion is removed and including apparatus for ejecting the portion from the mold opening comprising, means for contacting said portion in the opening to dislodge the portion from the opening, means for withdrawing the contacting means away from the mold opening, and means substantially preventing air flow through said contacting means while the contacting means approaches said portion and preventing air through the contacting means upon the completion of said approach and during said withdrawal.

A more specific feature of the invention is the provision of such an apparatus for removing the portion from the mold opening including an inverted cup-shaped member mounted adjacent to the mold having the edge thereof adapted to enter the mold opening during the striking of the material within the opening and having the base of the cup spaced from the portion within the opening with this base being provided with an opening therein and valve means including a strip of flexible sheet material across the opening on the inner surface of the cup arrange against the cup surface substantially to close the opening during the approach of the cup to the material in the opening and displaceable away from the cup surface at the completion of the approach and during the withdrawal.

Other features and advantages of the invention will be apparent from the following description of one embodiment of the invention taken in conjunction with the accompanying drawings. Of the drawings:

Figure 2 is a longitudinal section through substantially the center of the upper portion of the device of Figure 1;

Figure 3 is a fragmentary end elevation of the device of Figure 1 taken from the left hand end thereof;

Figure 4 is a fragmentary vertical section taken substantially thorugh the device of Figure 1 with the mold plate in substantially fully extended position;

Figure 5 is a fragmentary elevation showing the inner side of a knockout member of this invention.

Figure 1:
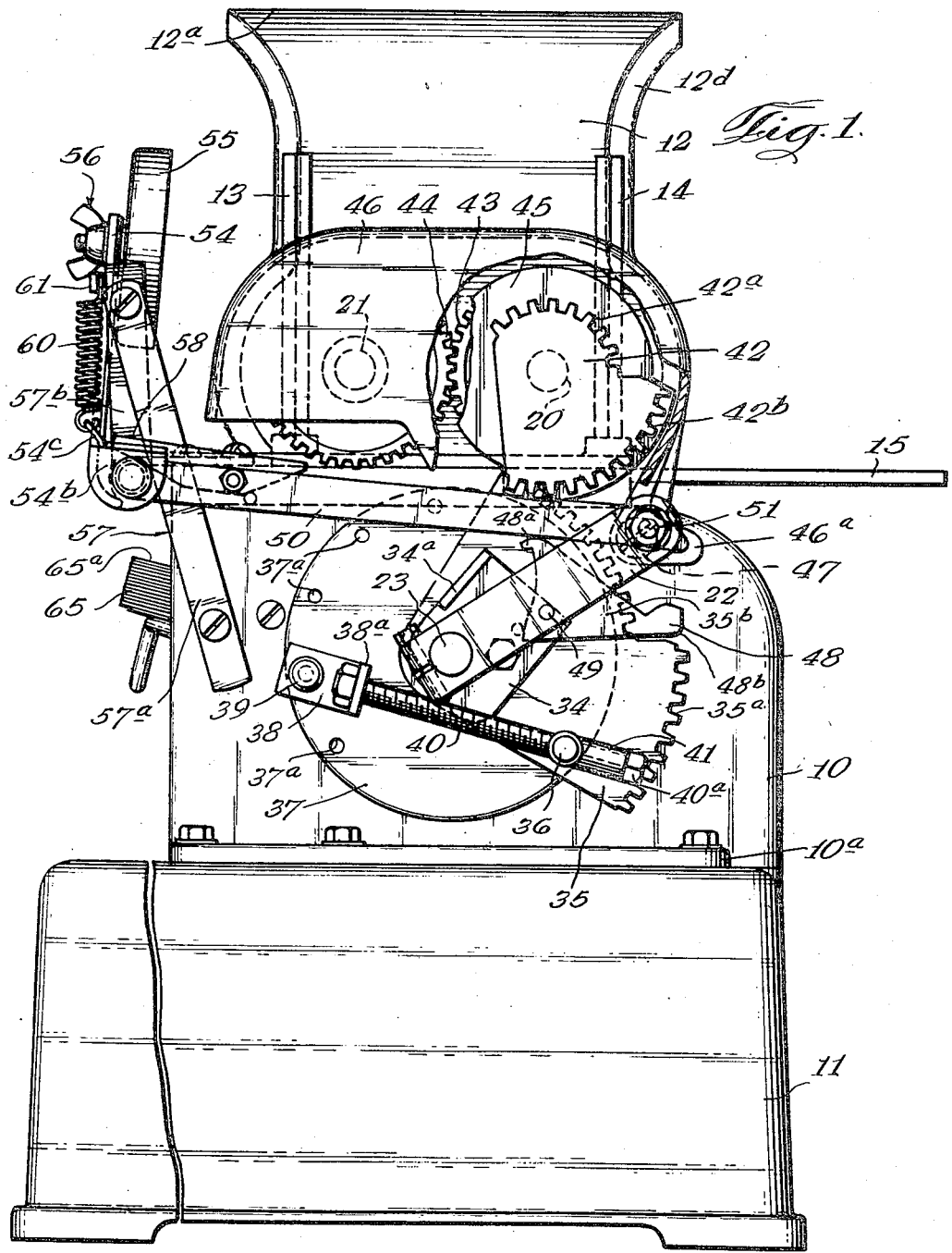
Figure 1 is a side elevational view of a molding apparatus embodying this invention with the mold plate thereof in substantially fully retracted position.

The invention disclosed and claimed herein serves to provide an improved apparatus for removing a molded portion of plastic material from within the mold opening of a mold member such as a plate. The apparatus shown in the drawings and described herein is similar to that described and claimed in my copending application Serial No. 360,866, filed June 11, 1953.

As can be seen from the drawings, the molding apparatus illustrated therein is provided with a mold casing 10 that is adapted to be bolted by means of a base flange 10a to a table or other support or to the top of a casing 11 that may house an electrically operated drive mechanism in the manner shown in my above identified copending application.

On the top of the mold casing 10 there is provided a hopper 12 which is adapted to contain a moldable material such as ground meat for making hamburger patties or sausage patties, ground fish for making fish patties and other moldable materials which may or may not be food materials. The hopper is provided with an upwardly flaring top 12a, a base 12b, outwardly flaring end portions 12c at the bottom thereof and end reinforcing ribs 12d. The base 12b is adapted to be removably attached to the top portion 10b of the casing 10 by front and rear bolts 13 and 14 respectively.

Located between the bottom 12b of the hopper 12 and the top 11a of the casing 11 is a substantially horizontal mold plate 15 having a mold opening 15a therein. The mold opening may be circular, square or any other desired shape. The mold plate is separated from the base 12b of the hopper by an auxiliary plate 16 that is provided with an exit opening 16a adapted to communicate with the mold opening 15a so that material may be fed therethrough from the hopper into the mold opening. As is explained in my copending application Serial No. 284,355, filed April 25, 1952, now Patent No. 2,706,830, issued April 26, 1955, the mold plate 15 slides within a groove in a secondary auxiliary plate 17 that rests on the top of the casing 10. This second auxiliary plate is provided with a transverse raised portion 17a immediately to the rear of the exit opening 16a. This raised rib serves to reduce the frictional drag of the mold plate 15 and aids in filling completely the mold opening 15a. The provision of the second auxiliary plate 17 permits interchanging mold plates 15 of varying thicknesses and having different sized or shaped mold openings 15a so that a patty having predetermined desired characteristics may be produced.

In order to feed material from the hopper 12 through the opening 16a into the mold opening 15a there are provided a pair of oscillatable feeders 18 and 19 mounted for oscillation on shafts 20 and 21 respectively. The feeder 18 is provided with a ram portion 18a and the feeder 19 is provided with a similar ram portion 19a. As can be seen in Figure 2, these ram portions are extended parts of the periphery of the feeders so as to provide a step construction. The construction and operation of such a feeding arrangement is described more fully and is claimed in my prior Patent 2,530,061, dated November 14, 1950.

In order to operate the molding device of this invention, there is provided a lever 22 and a shaft 23 combination with the lever being mounted on the shaft and the two being oscillatable as a unit. The shaft 23 extends through the front side of the casing 11 and this extending part is attached to the lever 22.

A motor drive for the molding apparatus may be located within the casing 11 and may be the type shown in my above mentioned copending application 360,866.

Rotatably attached to the shaft 23 is a small plate 34 provided with an outwardly projecting flange 34a that is adapted to be abutted by the forward edge of the lever 22 when the lever moves from right to left as shown in Figure 1 This plate 34 is bolted or otherwise attached to a gear sector 35. This gear sector is also rotatably mounted on the shaft 23. Extending outwardly from the lower part of this gear sector is an apertured stud 36.

Between the gear sector 35 and the adjacent side of the casing 10 there is provided a flat, substantially cylindrical casing 37 containing a coiled spring (not shown)

as is illustrated in my copending application 360,866. This spring is an ordinary flat, steel spring coiled upon itself, having its outer end attached to the edge of the casing 37 and its inner end operably attached to the shaft 23. The spring casing 37 is rotatable on the shaft 33 and is provided with spaced holes 37a arcuately arranged adjacent to the edge of the casing. These holes are provided so that the tension of the spring may be predetermined by engaging a selected hole with a bracket 38 held in place on the casing by a removable pin 39 having a knurled outer end so that the pin may be easily screwed into and out of a selected hole 37a.

The adjustment of the spring tension is accomplished further by providing an adjustment bolt 40 extending between a flange 38a on the bracket 38 and the apertured stud 36 through which the bolt 40 extends. The stud 36 is pivotally mounted on the gear sector 35 and the outer end of the bolt 40 is provided with a collar 41 extending between the head 40a on the end of the bolt and the stud 36. As can be seen, with this arrangement, the rotatable casing 37 is tied to the rotatable gear sector 35 by means of the adjustable bolt 40. As the spring within the casing 37 is rotated with the shaft 23 the rotation of the spring drives the casing 37 and thus the gear sector 35. The spring force that causes this rotation of the gear sector may be adjusted by adjusting the tension on the spring which is accomplished by regulating the effective length of the bolt 40. The gear sector 35 is divided into two gear segments 35a and 35b. The first segment 35a has a radius that is considerably greater than the radius of the segment 35b. The gear sector 35 engages a second gear 42. This gear, likewise, has two segments 42a and 42b. The first gear segment 42a has a relatively small radius and is adapted to be engaged by the gear segment 35a. Similarly, the segment 42b, which has a relatively large radius, is adapted to engage gear segment 35b.

The feeder shaft 20 has attached thereto a circular gear 43 which engages a second circular gear 44 on the second feeder shaft 21. The first circular gear 43 is held in place on the shaft 20 by the gear 42 being fastened to this shaft. The second gear 44 and thus the shaft 21 and feeder 19 are held in place by a disc 45 on the shaft 20 and overlapping the edge of the second gear 44. This construction greatly simplifies the mounting of the gears, shafts and feeders and makes it much easier to disassemble the machine for cleaning purposes.

In order to prevent accidental engagement of foreign objects with the gearing, there is provided a shield 46 having the shape of an elongated, inverted cup. This shield is hingedly attached to the casing 10 by means of a bolt 47 at the rear lower edge of the shield with this bolt being attached to the casing 10. The shield is rotatable about this bolt. The rear lower edge of the shield 46 adjacent to the bolt 47 is provided with a rearwardly-extending flange portion 46a by means of which the shield 46 may be rotated rearwardly around the bolt 47 to expose the gears. The shield is held in its normal gear enclosing position by means of an inwardly-extending ear 46b at the upper front edge of the shield adapted to engage a bolt 13 in the manner shown in Figure 3.

As can be seen in Figures 1 and 2, where the apparatus is arranged with the mold plate in completely retracted position and the feeders 18 and 19 in the position shown, the lever 22 is to the right (Figure 1) and the gear segment 35b engages the gear segment 42b. Rotation of the gear 35 in a counterclockwise direction as shown in Figure 1 will cause clockwise rotation of the gear 42. This will rotate the feeders 18 and 19 away from the exit opening 16a. This movement becomes quite rapid when the gear segment 35a engages the small gear segment 42a.

The above described counterclockwise rotation of the gear 35 is brought about by the lever 22 engaging the flange 34a on the plate 34. This flange, therefore, in effect, ties the lever 22 to the gear 35 in moving the feeders 18 and 19 away from their positions adjacent to the opening 16a toward fully retracted positions. Movement of the lever 22 in the opposite direction or toward the position shown in Figure 1 causes the feeders to move to the position shown in Figure 2 to force material in the hopper through the exit opening 16a into the mold opening 15a. At the initial portion of this movement the lever 22 is tied to the plate 34 by means of a weighted catch 48 rotatable about a fulcrum pin 49 located adjacent to the lower portion thereof. This catch is rotatable on the lever 22 and is provided with an extending lip 48a adapted to engage the upper edge of the flange 34a and a weighted upper end 48b. With this arrangement the catch 48 ties the lever 22 to the plate 34 and thus to the gear 35 during the initial portion of the feeding movement only. However, as soon as the lever 22 has reached an almost vertical position, the weighted end 48b of the catch 48 causes the catch to rotate about the fulcrum pin 49 to its retracted position as shown in Figure 1.

Movement of the lever 22 beyond this vertical position where the catch has been released causes movement of the gear 35 to be accomplished solely through the stressed spring in the spring casing 37. This spring, as has been previously described, is rotated by the oscillation of the shaft 23. When the shaft is oscillated in a clockwise direction toward the position shown in Fig. 1 the stressed spring causes oscillation of the casing 37. This, in turn, causes a corresponding movement of the gear 35 by means of the bolt 40 so that the stress on the spring operates through the gear 35, gear 42, shaft 20, gear 43, gear 44 and shaft 21 to oscillate the feeders 18 and 19. The spring force will, of course, only be applied to the rams when the rams are moved toward the exit opening 16a. The spring will thus yield to accommodate resistance caused by the material within the hopper resisting the movement of the feeders. This spring tension may, of course, be varied by varying the effective length of the bolt 40 between the flange 38a and the stud 36 so as to provide most efficient filling of the mold opening 15a with material having varying grades of plasticity.

Oscillation of the lever 22 is also used to reciprocate the mold plate 15. This is accomplished by providing a linkage member 50 having one end rotatably attached to the upper end of the lever 22 by means of a bolt 51 and the other end rotatably attached to the outer end of the mold plate 15.

This outer end of the mold plate 15 is provided with a pair of brackets 52 at the edges thereof and extending beyond this end. Extending between the outer end of these brackets is an axle 53 that is rotatably engaged by the linkage member 50 to reciprocate the mold plate 15. Rotatably mounted on this axle 53 is a holder 54 for a knockout ring 55 adapted to enter the mold opening 15a and remove material therefrom. This holder 54 which is rotatably mounted on the axle 53 is provided with an extended portion 54a extending toward the hopper 12 with the innermost end of this portion adapted to have the knockout ring 55 removably attached thereto as by a bolt and nut assembly 56. The opposite end of the member 54 which is mounted on the axle 53 is provided with an outwardly-extending flange portion 54b.

In order to raise the removing member or knockout ring 55 to the position shown in Figs. 1, 2 and 3 there is provided a toggle joint 57. One end 57a of this toggle joint is rotatably attached to the casing 10 and the other end 57b is rotatable on the axle 53 and located immediately beneath the flange 54b of the knockout ring holder 54. The toggle joint 57 is so arranged that movement of the mold plate 15 to its retracted position with the mold opening 15a beneath the hopper exit opening 16a raises the toggle ends 57a and 57b as shown in Fig. 1.

This raising of the toggle ends also raises the knockout ring holder 54 because of the engagement of the toggle end 57b with the flange 54b.

In order to retain the knockout ring 55 and its holder 54 in elevated position, there is provided a catch member 58 rotatably mounted on the linkage member 50 which moves the mold plate 15. This catch member is mounted for rotation about a bolt 50a and is so proportioned that the heavy end of the catch member is beyond this bolt and rests against the flange 54b. The catch member has its outer end so positioned that it drops down behind the knockout ring holder flange 54b when this flange has reached the position shown in Fig. 1 so that the holder and ring are in operative position and do not fall when the mold plate starts to move in the opposite direction. With this movement the flange 54b is released by the toggle joint end 57b.

In order to disengage the catch member 58 from the flange 54b and permit the knockout ring to fall downwardly and knock the material from within the mold opening 15a there is provided an arrangement whereby the upper end of the toggle member 57a engages the light end of the catch member 58. This rotates the catch member in a clockwise direction as shown in Fig. 1 in order that the flange 54b will be released. As soon as this flange is released, the knockout ring holder 54 and thus the ring 55 falls forwardly so that the ring enters the opening 15a to knock molded material therefrom. The fall of this holder and ring is cushioned by means of a rubber button 59 attached to the inner surface of the holder 54. The parts of the device are so arranged that this action occurs when the mold opening has been moved from its first position illustrated in Fig. 1 where it receives material from the hopper toward its second position illustrated in Fig. 4 where the molded material is removed from the opening.

In order to accelerate the downward movement of the knockout ring 55 and thus give the material within the opening a sharp rap so that the material will be removed cleanly, there is provided a helical tension spring 60 extending between a pin 61 on the toggle member 57b and a piece 54c on the holder 54. With this arrangement the spring is under tension when the holder 54 is in elevated position and the ring is snapped sharply downwardly to remove the molded material from the opening 15a as soon as the catch member 58 releases the holder 54. Located within the housing 10 is the separator sheet feed for the apparatus. These separator sheets are ordinary sheets of thin, moisture-resistant paper and are adhered to the bottom of the mold plate 15 so as to extend across the mold opening in contact with the bottom surface of the material within the opening. Ordinarily where ground meat is being molded there will be sufficient meat juices on the bottom surface of the mold plate to provide the necessary adhesion. Other adhering means may be used, however, if desired. Paper sheet arrangements of this nature are described and claimed in my copending application Serial No. 185,243 filed September 16, 1950, now Patent No. 2,684,501, issued July 27, 1954.

The paper sheet feeding arrangement shown herein is described and claimed in my above mentioned copending application 360,866. In this arrangement, individual sheets 65a of paper from the stack 65 are applied to the bottom of the portion of molded material within the mold opening 15a as this mold opening passes from the fully retracted position shown in Figure 2 toward the fully extended position shown in Figure 4.

The knockout ring 55 is in the shape of an inverted cup. The edge portion 55a of this cup is adapted to strike the edge portion of the patty 70 or similar portion of molded material. The base 55b of the cup is always spaced from the molded portion 70 and this base is provided with a plurality of openings 55c.

In order that these openings will be vented only during the withdrawal of the ring 55 from the opening 15a, there is provided a valve means including a sheet 71 of flexible material preferably a transparent synthetic plastic such as a vinyl resin. This sheet is held in the interior of the ring 55 and is retained in place by means of the bolt 56.

The construction and operation of the molding apparatus of this invention is described in detail in the above mentioned copending application 360,866. As is described there, the mold plate 15 is moved from retracted to extended position and when the extended position is reached the spring 60 causes the knockout ring 55 to be snapped downwardly rapidly so that the edge 55a of the ring strikes the edge portion of the molded material 70 and ejects it from the opening so that the material 70 with an adhered paper divider sheet 65a falls onto a support. During the descent of the ring 55 the flexible sheet 71 closes the openings 55c so that the cushion of air is trapped within the ring 55. This cushion of air prevents the edge portion 55a penetrating the material 70 to an excessive depth. At the end of the descent of the ring 55 and during the withdrawal of the ring from the opening the flexible sheet 71 is bent away from the opening 55c as shown by dotted lines in Figure 4, to expose these openings and vent air therethrough. This prevents the formation of a substantial partial vacuum above the molded material 70 at the moment of ejection and while the material is moving downwardly away from the mold plate 15 so that the material 70 is relatively free to continue its donward movement.

The valve means of this invention is quite important as it produces a clean dislodgment of the molded material from within the mold opening 15a. Thus, by providing a structure wherein an air valve in the ring is closed during the descent of the ring but is opened immediately upon completion of this descent and is open during the withdrawal, the edge of the knockout ring does not have an opportunity to embed too deeply into the plastic material so that the material will not cling to the ring. Thus, the material 70 with the sheet 65a falls substantially freely. Neither the base 55b of the ring nor the plastic sheet 71 touches the molded material.

The result achieved by means of this invention is apparent in that smoother, better-appearing patties 70 are produced and the tendency to form ragged edges is greatly diminished. Furthermore, a more uniform stack of molded patties is formed.

Having described my invention as related to the embodiment shown in the drawings, it is my intention that the invention be not limited by any of the details of description unless otherwise specified, but rather be construed broadly within its spirit and scope as set out in the accompanying claims.

I claim:

1. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for contacting said portion to dislodge the portion from the opening; means operatively associated with said contacting means for withdrawing said contacting means away from said dislodged portion; and means operatively associated with said contacting means substantially preventing air flow through said contacting means while the contacting means approaches said portion and venting air through the contacting means upon the completion of said approach.

2. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for striking said portion at areas adjacent to the edge thereof to dislodge the portion from the opening; means operatively associated with said striking means for trapping a cushion of air against said portion during the approach of said striking means; means operatively associated with said striking means for withdrawing said striking means away from the mold opening; and means operatively associated with said striking means for venting said air cushion at susbtantially the end of said approach and upon said withdrawl.

3. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for striking said portion at areas adjacent to the edge thereof to dislodge the portion from the opening including an inverted cup-shaped member mounted adjacent to said mold having the edge thereof adapted to enter said mold opening upon said striking; means operatively associated with said striking means for trapping a cushion of air against said portion during the approach of said striking means; means operatively associated with said striking means for withdrawing said striking means away from the mold opening; and means operatively associated with said striking means for venting said air cushion at substantially the completion of said approach and during said withdrawal.

4. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for striking said portion at areas adjacent to the edge thereof to dislodge the portion from the opening including an inverted cup-shaped member mounted adjacent to said mold having the edge thereof adapted to enter said mold opening upon said striking and having the base of the cup spaced from said portion to trap a cushion of air therebetween; means operatively associated with said striking means for withdrawing said striking means away from the mold opening; and means operatively associated with said striking means for venting said air cushion at substantially the completion of said approach and during said withdrawal.

5. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for striking said portion at areas adjacent to the edge thereof to dislodge the portion from the opening including an inverted cup-shaped member mounted adjacent to said mold having the edge thereof adapted to enter said mold opening upon said striking and having the base of the cup spaced from said portion, said base being provided with an opening therein; valve means operatively associated with said striking means substantially closing said opening during the approach of said cup-shaped member to trap a cushion of air against said portion during said approach; means operatively associated with said striking means for withdrawing said striking means away from the mold opening; and means operatively associated with said striking means for effectively opening said valve at substantially the completion of said approach and during said withdrawal.

6. In a molding apparatus for molding portions of a plastic material including a base member, a mold operatively associated therewith having a mold opening into which said material is received to form the portion and from which said portion is removed, apparatus for removing said portion from the mold opening comprising: means operatively associated with said mold adjacent to the opening for striking said portion at areas adjacent to the edge thereof to dislodge the portion from the opening including an inverted cup-shaped member mounted adjacent to said mold having the edge thereof adapted to enter said mold opening upon said striking and having the base of the cup spaced from said portion, said base being provided with an opening therein; and valve means operatively associated with said striking means including a sheet of flexible material across said opening on the inner surface of said cup arranged against said cup surface substantially to close said opening during the approach of said cup-shaped member to said portion in the mold opening and displaceable away from said cup surface at substantially the completion of said approach and during said withdrawal.

References Cited in the file of this patent

UNITED STATES PATENTS

| 785,742 | Lipps | Mar. 28, 1905 |
| 1,987,029 | Shelgren | Jan. 8, 1935 |
| 2,487,271 | Petri | Nov. 8, 1949 |
| 2,506,213 | Hall | May 2, 1950 |
| 2,530,062 | Holly | Nov. 14, 1950 |

FOREIGN PATENTS

| 557,228 | France | Apr. 28, 1923 |